Feb. 21, 1950   E. B. HOBSON   2,497,941
ROTARY SCRAPING TOOL FOR MEAT BLOCKS OR THE LIKE
Filed Aug. 25, 1947
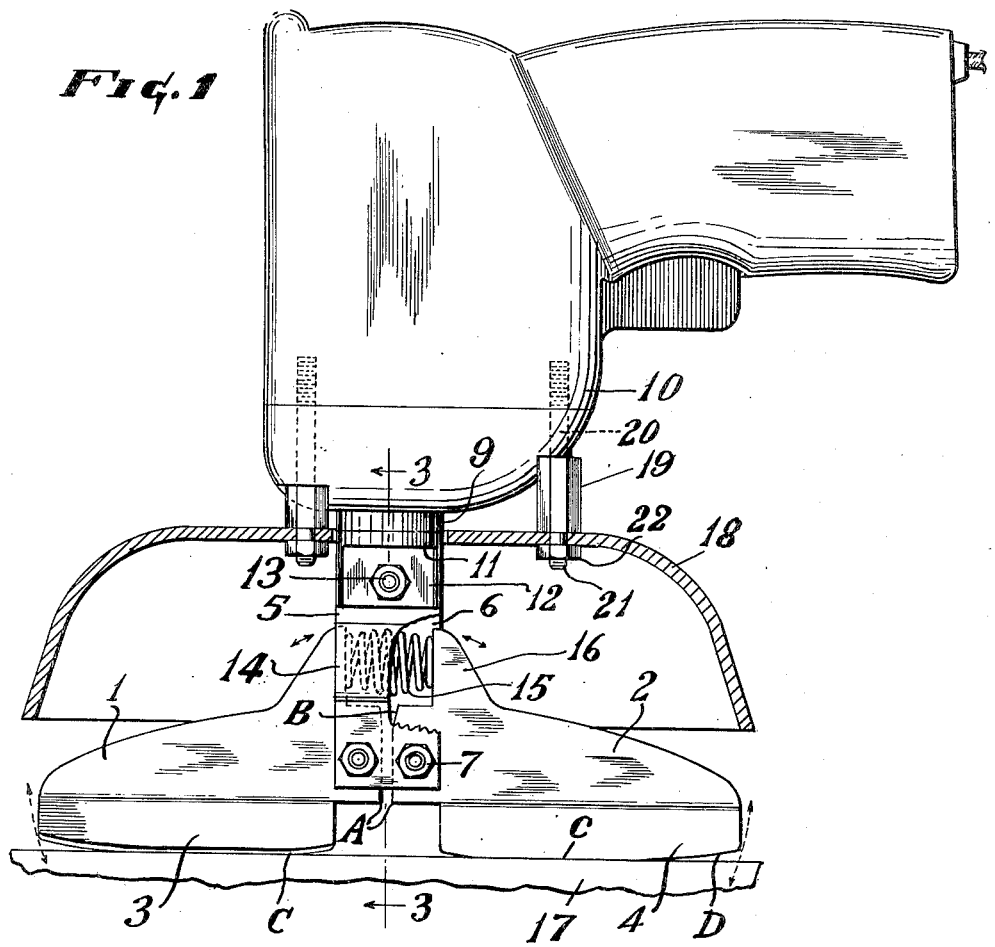
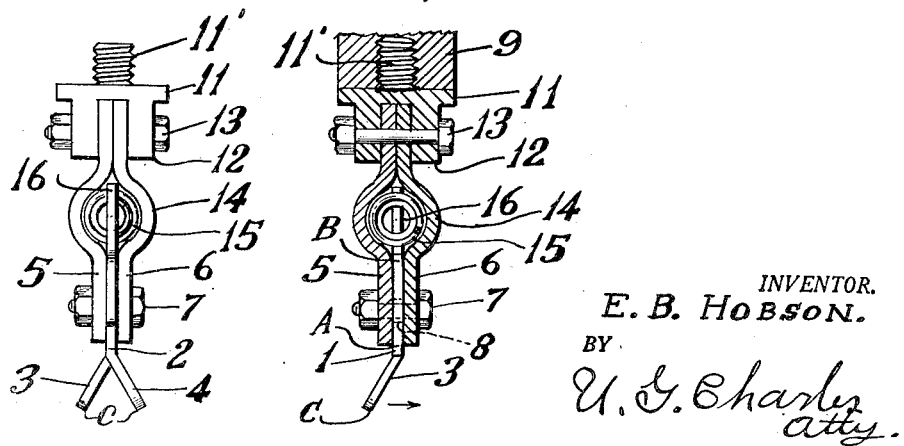
INVENTOR.
E. B. HOBSON.

Patented Feb. 21, 1950

2,497,941

UNITED STATES PATENT OFFICE 2,497,941

ROTARY SCRAPING TOOL FOR MEAT BLOCKS OR THE LIKE

Elmer B. Hobson, Wichita, Kans.

Application August 25, 1947, Serial No. 770,417

1 Claim. (Cl. 144—2)

This invention relates to improvements in a rotary scraping tool for meat blocks, or the like, and involves features of improvements over my former patent application Ser. No. 693,864, filed August 30, 1946, and issued Nov. 9, 1948, as Patent No. 2,453,371.

The principal object of this invention is an improved means to rockably carry a pair of scraping blades, and improved means to readily attach the scraping tool to an electric motor for the purpose of rotating the tool.

Another object of this invention is to construct each scraping blade and its carrying arm therefor integrally, the scraping edge of the blades being sharpened by filing the edges transverse to the sides of the blades and being capable of an appreciable number of sharpenings.

A still further object is to eliminate a universal connection between the motor and tool, in which instance, an angular position of the turning axis of the motor with respect to the meat block is accommodated by the rockable connection of the blades in co-action with a transverse rock thereto on the scraping edges of the blades longitudinally, whereby the scraping edges will at all times contact the surface of the meat block during their rotation regardless of an angular position of the motor.

A still further object of this invention is to provide a portion of the scraping edges of the blades adjacent their outer free ends with a gradual arc upward for avoiding direct centrifugal outward throw of removed particles from the ends of the blades.

A still further object of this invention is to construct a scraping tool that is inexpensive to make, efficient in its performance, and safe during its operation.

These and other objects will hereinafter be more fully explained, reference being had to the accompanying drawing forming a part of this specification, and in which like characters will apply to like parts in the different views.

Referring to the drawing:

Fig. 1 is a side elevation of the scraping tool with an electric motor attached, parts being broken away for convenience of illustration.

Fig. 2 is an end or transverse view of Fig. 1, the motor and hood being removed.

Fig. 3 is a sectional view taken on line 3—3 in Fig. 1, the chuck of the motor being fragmentarily shown.

The invention herein disclosed relates to improvements in a rotary scraping tool which is particularly adaptable for dressing or scraping meat blocks, it being understood that meat blocks during the process of use must be frequently cleansed of meat particle accumulation, or the like, as well as the block must be smoothened as the result of cuts made in the surface of the block during the time of severing, sawing, or chopping meat. Consequently the purpose of this invention is to eliminate manual scraping of the blocks by some bladed element.

The scraping tool, in this instance, consists of a pair of oppositely extending radial arms 1 and 2, said arms being horizontally positioned and having at their lower extremities integrally formed thereto blades 3 and 4, respectively.

To rockably mount the blade arms 1 and 2 is accomplished through the medium of a pair of clamping bars 5 and 6. A lower portion of the bars are spaced apart sufficient to receive therebetween the inner ends of the blade arms for rockably connecting the arms by bolts 7 that extend through the bars and their respective inner ends of the arms. To avoid binding of the arms as positioned between the bars there are provided spacing sleeves 8 as shown by dotted lines in Fig. 3.

The upper ends of the bars are clamped together by a connector that is detachably secured to the cylindrical chuck 9 of an electric motor 10. The connector has a cylindrical portion 11 and downwardly extending and spaced ears 12 to straddle the upper ends of the bars which are rigidly secured by a bolt 13 extending therethrough. Integrally joined and extending upwardly from the cylindrical portion 11 of the connector is a threaded stud 11' reduced in diameter over that of the cylindrical portion, said portion to serve as a stop when threadedly engaging the stud into the internally threaded motor chuck as shown in Fig. 3.

Intermediately of the ends of the bars, a portion of each bar is arcuately depressed outwardly as at 14 to provide working space for an expansion coil spring 15 positioned within the concave sides of the bars. The ends of the spring contact their respective upstanding extensions 16 of the blade arms for the purpose of urging the blades downwardly at their free ends. The extreme downward rocking movement of the blades is controlled by striking contact of corresponding points A at the lower and inner extremities of the blade arms as shown in Fig. 1, while the upward rock of the arms is controlled by striking contact of corresponding points B at the upper and inner extremities of the blade arms.

The inner ends of the blade arms are spaced apart sufficient to permit independent rock of said blade arms but being controlled in their extreme movements as above stated, in other words, each blade is floatingly arranged to accommodate its respective irregular surface of the meat block 17 as said blade travels thereover, a portion of said meat block being shown in Fig. 1.

The blades are bent obliquely from their respective arms with respect to cross section, the slant of the blades being rearward from the arms in consideration of the forward direction of arm rotation. The cutting or scraping edge C of the blades is formed by filing the lower extremities of the blades transverse with the sides of the blade to present the cutting edge C at the leading side. The terminal ends of the blades are slightly rounded to avoid gouging into the work being operated upon. A minor portion of the cutting edge of each blade adjacent its outer end has a gradual arc upwardly as at D and as shown in Fig. 1 whereby cuttings and removed particles will be discharged from the blades without direct centrifugal throw outward from the tips of the blades as the oblique position of the blades retain the particles downwardly upon the meat block, while the arc of the cutting edge is means to gradually move the removed particles from the blades during rotation thereof.

As a guard against accidental contact of an operator with the scraping blades, there is provided an overhanging hood 18. Said hood is rigidly secured to the motor housing by hexagon-shaped spacers 19 having oppositely extending threaded studs 20 and 21 from the upper and lower ends thereof respectively as shown in Fig. 1, the studs 20 substituting the original bolts of the motor, while the studs 21 extend through the hood and secured by nuts 22.

To remove the tool from the motor, the connector is unscrewed from the chuck of the motor, in which case, other similar tools may be applied that have differently arranged blades such as illustrated in my former patent application as above mentioned.

In operating the tool, the same is rotated by energizing the electric motor. By centrifugal action of the blades and a slight downward pressure upon the motor as gripped by the hand will position the blades substantially as shown in Fig. 1, whereby scraping of the block is accomplished by the movement of the tool about the surface of the block until its entirety has been cleansed or smoothened. As meat blocks become irregular on their working surfaces during the process of cutting and chopping meat, the blades are adapted to rock independently of each other for following their respective irregularity to cleanse the same, and by additional operation of the tool the surface of the block may be dressed to a straight plane.

While I have shown and described this invention specifically, the same may be changed slightly therefrom as lie within the scope of the appended claim.

Having fully described my invention what I claim as new and desire to secure by Letters Patent is:

In a rotary scraping tool for meat blocks, a pair of bars vertically positioned, a side portion of the bars adjacent their upper ends being contactingly arranged while a side portion thereof adjacent their lower ends are spaced apart; a pair of arms oppositely extending from the lower ends of the bars and being rockably mounted therebetween, the arms having blades at their lower extremities as scraping means for meat blocks, the bars intermediately of their ends being depressed outwardly to provide a circular space, a coil spring positioned in the circular space, said arms adjacent their inner ends having upstanding extensions to contact their respective ends of the spring for urging the free ends of the arms downwardly, and a connector having downwardly extending ears to clamp the upper ends of the bars and a stud extending upwardly to threadedly receive the rotating element of an electric motor as a power to rotate the tool.

ELMER B. HOBSON.

REFERENCES CITED

The following references are of record in the file of this patent:

UNITED STATES PATENTS

| Number | Name | Date |
| --- | --- | --- |
| 672,554 | Henkel | Apr. 23, 1901 |
| 1,627,263 | Baily | May 3, 1927 |
| 1,641,645 | Skolnik | Sept. 6, 1927 |
| 1,643,882 | Faiver | Sept. 27, 1927 |
| 1,650,035 | Peterson | Nov. 22, 1927 |
| 2,453,371 | Hobson | Nov. 9, 1948 |